(No Model.) 3 Sheets—Sheet 2.
W. BUTTERFIELD.
SHEAF CARRIER FOR GRAIN BINDERS.
No. 362,930. Patented May 17, 1887.
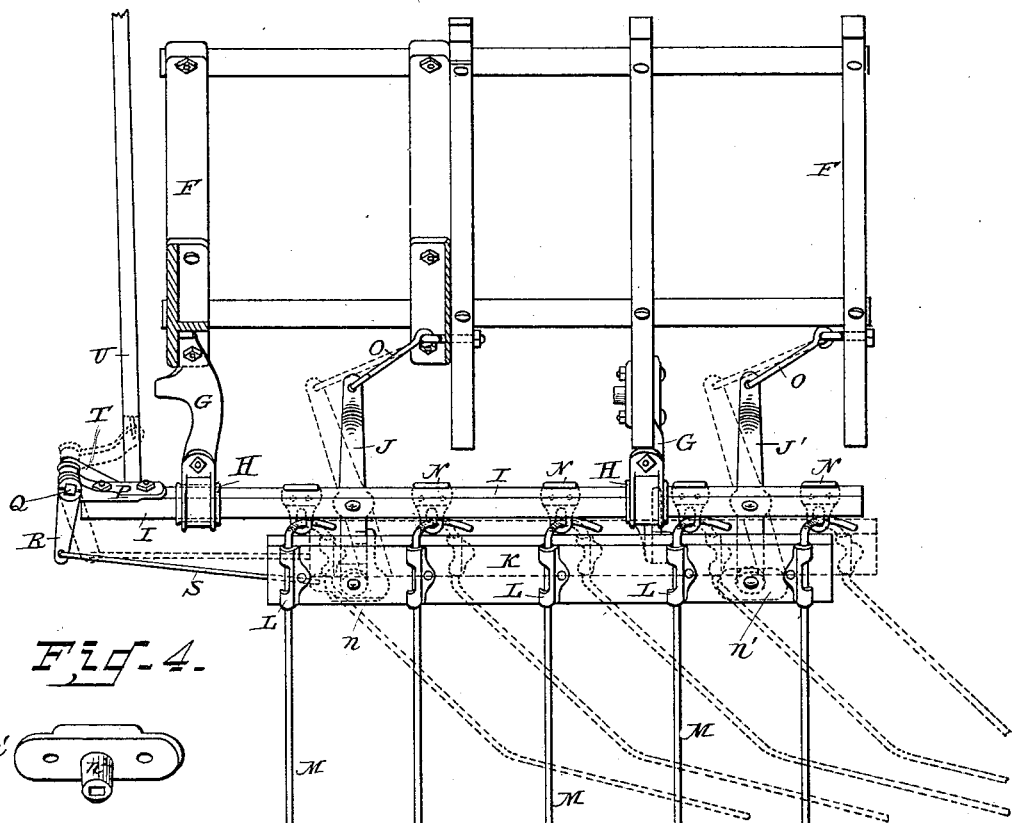
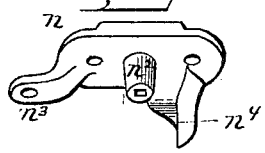
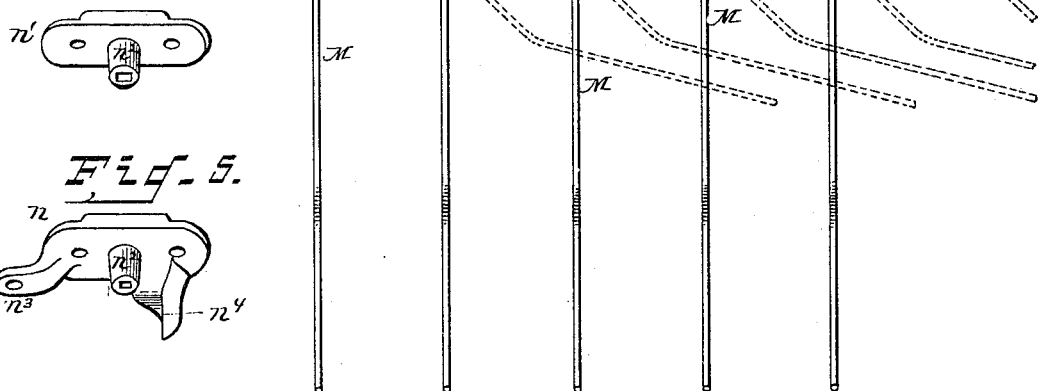
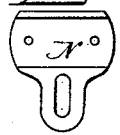
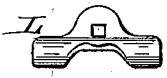
Witnesses:
Inventor:
William Butterfield
By Phil. T. Dodge atty (No Model.) 3 Sheets—Sheet 3.
W. BUTTERFIELD.
SHEAF CARRIER FOR GRAIN BINDERS.
No. 362,930. Patented May 17, 1887.
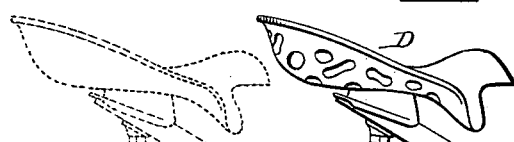
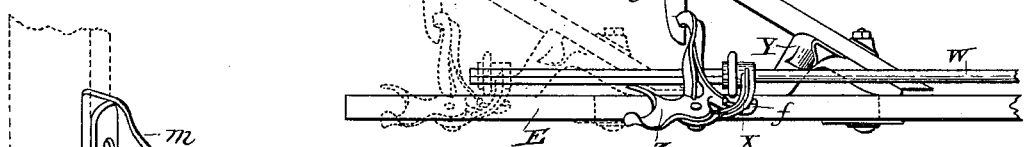
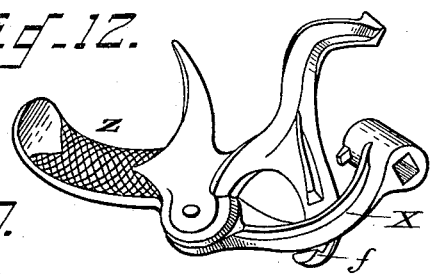
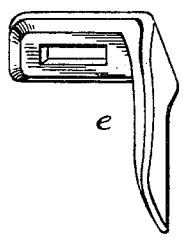
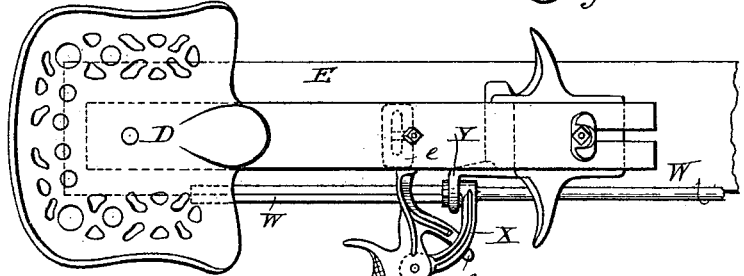
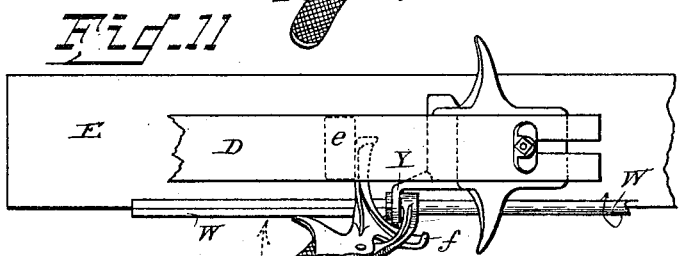
Witnesses:
W. R. Kennedy.
H. P. Hollingsworth
Inventor:
William Butterfield
By Phil. T. Dodge Atty

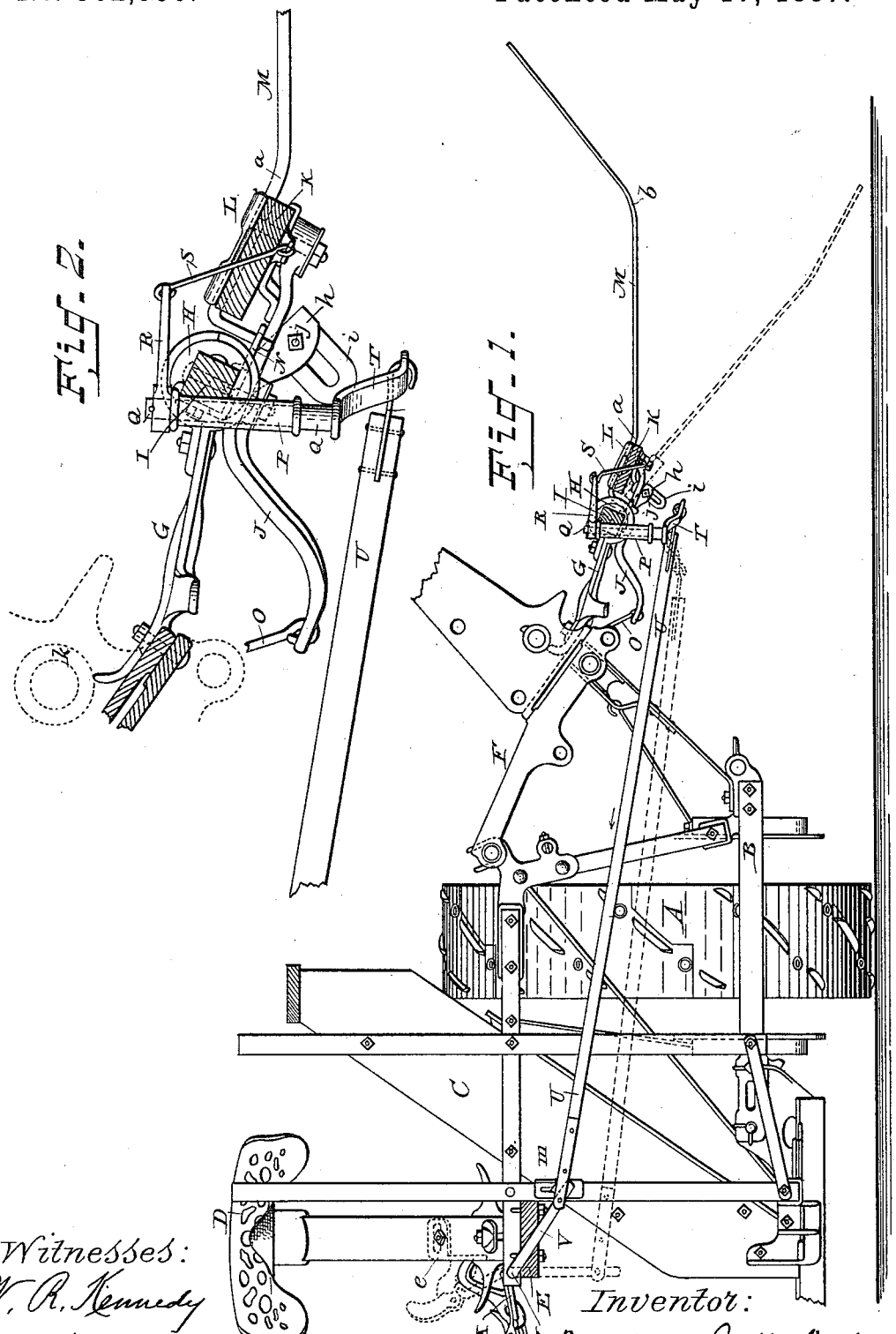

United States Patent Office.

WILLIAM BUTTERFIELD, OF AUBURN, NEW YORK, ASSIGNOR TO D. M. OSBORNE & COMPANY, OF SAME PLACE.

SHEAF-CARRIER FOR GRAIN-BINDERS.

SPECIFICATION forming part of Letters Patent No. 362,930, dated May 17, 1887.

Application filed November 8, 1886. Serial No. 218,294. (No model.)

*To all whom it may concern:*

Be it known that I, WILLIAM BUTTERFIELD, of Auburn, in the county of Cayuga and State of New York, have invented certain Improvements in Sheaf-Carriers for Grain-Binders, of which the following is a specification.

My invention has reference to that class of sheaf-carriers which consist of a series of fingers jointed to the binder in position to receive the sheaves as they are delivered therefrom, and in such manner that the fingers may at the will of the operator be permitted to swing downward and rearward for the purpose of delivering the sheaves upon the ground while the machine is in motion; and the invention consists in the construction and arrangement of parts for supporting and positively controlling the carrier arms or fingers.

In the accompanying drawings, Figure 1 represents a front elevation of a portion of the frame-work of a grain harvesting and binding machine with my carrier attached thereto. Fig. 2 is a front elevation of the carrier, the adjacent end of the harvester, and the parts immediately connected therewith, the binder-gear standard being indicated by dotted lines. Fig. 3 is a top plan view of the lower or base portion of the binder-frame with my carrier connected thereto. Figs. 4 and 5 are perspective views of the bearing-plates for the two links which support the bar on which the sheaf-carrying arms are mounted. Fig. 6 is a side elevation of one of the arms used to sustain the rolling bar. Fig. 7 is a face view of one of the plates mounted on the rolling bar to control the carrying-fingers. Fig. 8 is a face view of the clip-plates by which the fingers are attached to the sustaining-bar. Fig. 9 is a side elevation of the seat and its support and of the devices adjacent thereto for controlling the carrier, the parts being in the positions which they occupy when the carrying-fingers are in their elevated or operative position. Fig. 10 is a top plan view of said parts. Fig. 11 is a similar view with the parts in a different position. Fig. 12 is a view of the lever and its support. Fig. 13 is a perspective view of a stop-plate used in connection with the devices for elevating the carrying-fingers. Fig. 14 is a perspective view of the stop used in connection with other parts to sustain the carrying-fingers.

Referring to the drawings, A represents the main wheel, and B the wheel-frame, of a harvester having an elevator, C, by which the grain is delivered from the platform over the main wheel to the binder located on the outer side.

D represents the driver's seat, carried by a standard fixed to a stationary plank, E, in the inner side of the elevator-frame, and F is the base-frame of the binder, located outside of the main wheel and suitably supported on the wheel-frame, that it may slide forward and backward thereon to secure the application of the band to the middle of the grain under all circumstances.

The foregoing parts, as represented in the drawings, are of ordinary construction and arrangement, and are not claimed as of my invention.

In applying my improvement I secure rigidly to the lower outer edge of the binder-frame F two arms or brackets, G, extending outward on the stubble side, and adapted to encircle at their outer ends rotary sleeves or collars H, which give support to a rolling bar, I, extending therethrough from front to rear. To this rolling bar, near its opposite ends, I pivot at their middle two levers, J J', the lower ends of which are connected by pivot-joints, hereinafter described in detail, to bar K, while their upper ends are connected by links O to the binder-frame. To the bar K, I attach by clip-plates L or similar connections a series of parallel rods or fingers, M, which, as shown in Fig. 1, are bent upward at the point *a* close to the bar, and again at the point *b* midway of their length or thereabout. These fingers, which are free to turn in the clip-plates L, lie transversely across the bar K and normally at right angle to the line of travel. The inner end of each bar is bent at substantially a right angle to the remaining portion, forming, in effect, a crank. Each of these cranks is placed loosely through a slotted plate, N, fixed firmly to the under side of the rolling bar I. In a suitable bearing-plate, P, fixed to one end of the rolling bar, I, I mount a short transverse shaft, Q, carrying at one end a crank-arm, R, connected by a rod, S, to the bar K, and carrying at its opposite end a second crank-arm, T, pivoted to an actuating rod or bar, U. This rod is extended, as shown in Figs. 1 and 3, past the wheel to a crank-arm, V, carried by a horizontal rock-shaft, W, on the seat-plank, or any other suitable supports on the frame. The rock-shaft is continued rearward to a point adjacent to the driver's seat, where its end is squared and passed loosely through an operating-arm, X, journaled in a bracket, Y, on the seat-standard. The outer end of the arm X carries a foot lever or latch Z, pivoted midway of its length thereto, and arranged to abut at its inner end against an adjustable stop-plate, e, fixed to the seat-standard.

When the parts are released the weight of the carrier and the sheaves thereon tends to depress the carrying arms and throw the parts to the position indicated by dotted lines in the several figures.

To bring the parts to their normal positions, the operator depresses the lever Z with his foot, the effect being that the lever in turn depresses the arm X, turning the shaft W, and, through its arm V, pushing the bar U outward toward the stubble side of the machine. The bar, acting below the rolling shaft I and upon the crank of its transverse shaft Q, causes the crank-arm R of the latter, through the rod S, to pull the bar K horizontally toward the front. The movement of this bar turns the levers J J' upon their pivots, throwing their inner ends toward the rear, the effect of which is to turn the inclined links O downward toward a vertical position, in consequence of which the links act to depress the rear ends of the levers J J', which in turn roll the bar I in its bearings, lifting the bar K upward and raising the outer ends of the carrier-teeth M. At the same time that this rising motion of the bar K occurs it is being moved endwise, carrying the inner ends of the teeth bodily toward the front of the machine and causing the plates N to act on their crank-arms in such manner as to revolve the teeth about their longitudinal axes in the clip-plates L. In this manner the teeth are given a compound rising movement—that is to say, they are raised bodily at their outer ends by the rising motion of the bar K, and also turned upward at their outer ends to the normal position by reason of their rotation about their own axes in the bearings L. When the foot-lever has been depressed a sufficient distance to bring the carrier-teeth to their operative positions, the rear end of the lever passes over and abuts against the face of the stop-plate e, as shown in Fig. 10, and thus locks the carrier in position. To release the parts it is only necessary to turn the lever Z on its pivot until it disengages from the plate e, whereupon the parts will fall to the position indicated by dotted lines in the several figures, the carrier-teeth falling downward and swinging rearward, so that the bundles are delivered quickly and with an easy motion.

The movement of the parts employed for elevating the teeth is limited by a slotted vertically-adjustable plate, m, separately shown in Fig. 13, which is bolted to the frame, as shown in Fig. 1, in position to encounter the arm V and limit its movement.

The seat-standard is adjustable, as usual in machines of the present day, forward and backward upon its supporting-plank. It is for this reason that the arm X is arranged to slide longitudinally on the shaft and the foot-lever and its top attached to the seat-standard, this construction permitting the seat to be adjusted without effecting in any manner the operation of the parts mentioned. The stop e is slotted and secured by a bolt, as shown in Fig. 10, that it may be adjusted to vary the operative height of the carrier-arms as may be required. In order to prevent the lever Z from being turned too far by the action of the foot it is provided with a stop-arm, f, to engage the supporting-arm X, as shown in Figs. 10 and 11; but any other appropriate stop may be employed.

The essence of my invention resides in combining with a rolling bar, I, a longitudinally-movable bar, K, carrying the bent teeth provided in their inner ends with crank-arms adapted to receive motion by the longitudinal movement of the bar K; and it is manifest that the details of construction may be variously modified while retaining these characteristic features and a mode of action substantially such as described.

The shaft Q and its crank-arm and pitman form the most convenient means at present known to me for the operation of the bar K and the consequent elevation of the carrier; but other operating devices of a similar nature may be substituted therefor.

To limit the falling action of the teeth I provide either or both of the supporting-arms G with an extension, h, which serves as a stop to arrest and support the falling bar K. I commonly provide this support with a slotted vertically-adjustable plate, i, secured by a bolt, j, as shown in Fig. 6, so that the part may be adjusted to limit the descent of the bar K and the carrier-teeth at different points.

I commonly apply my carrier to binders having frames of the well-known Appleby type and effect the attachment by bolting the arms G to the binder-sills, as shown in Figs. 2 and 3, the ends of the arms being continued beyond the bolts and turned upward, as shown in Fig. 2, so as to bear against the lower tubular arm or shaft-bearing, k, of the binder-frame. This construction gives greater rigidity and relieves the bolts from a portion of the strain they would otherwise receive.

The links J J' may be pivoted to the bar K in any suitable manner; but I prefer to use bearing-plates n n', such as shown in Figs. 4 and 5, between the bar and the ends of the links, each plate provided with holes to receive fastening-bolts and with a journal or trunnion, $n^2$, to enter the link. The rear plate, n, has also an ear, $n^3$, to receive the rod S, and a shoulder, $n^4$, to encounter the link and limit the rearward movement of the bar K.

I am aware that sheaf-carriers have been constructed with a series of parallel arms or teeth, the outer ends of which were permitted to swing downward and rearward to discharge the bundle, the movement being somewhat similar to that of the teeth employed by me, and I therefore lay no broad claim to such feature; but I believe myself to be the first to form, support, and operate the teeth in the particular manner set forth and claimed herein.

Having thus described my invention, what I claim is—

1. In a sheaf-carrrer, the combination of the horizontally-arranged rolling bar, the longitudinally-movable bar carried thereby, the carrier-teeth journaled on the last-named bar and provided with crank-arms engaging guides on the rolling bar, and means, substantially as described, for effecting the rotation of the one bar and the longitudinal movement of the other, substantially as described.

2. The combination of the horizontally-arranged rolling bar I, the horizontal longitudinally-movable bar K, connected to the first by swinging arms or levers, the series of carrier-fingers, each bent at two points in its length and provided with crank-arms at the inner end, clip-plates L, or their equivalents, connecting said teeth to the bar K, bearings engaging the crank-arms, and means, substantially as described, for rolling the one bar and moving the other longitudinally.

3. In a sheaf-carrier, the horizontal rolling bar mounted in fixed bearings, the second bar, K, the levers J J', pivoted to said bars and connected at their inner ends to the frame or support by swinging links, and the carrier-teeth extended through bearings on the bar K and provided with crank-arms engaging eyes or guides on the bar I, whereby the longitudinal movement of the bar K is caused to effect both the elevation and the rotation of the carrier-teeth.

4. The rolling bar mounted in stationary bearings, the bar K, the connecting-levers and their links jointed to the main frame, the rock-shaft mounted on the rolling bar and provided with two crank-arms, the rod connecting one of said arms to the bar K, and the bar U, connected to operating devices under the control of the driver.

5. In combination with the bar U, for controlling a sheaf-carrier, its operating-crank V, the rock shaft carrying said crank, the arm X on said shaft, the foot-lever pivoted to said arm, and a stop or rest, $e$, wherewith said lever engages to hold the parts in position.

6. In combination with the shaft W, for operating a dropper, the adjustable seat-supporting standard, the arm X, arranged to slide upon the shaft and connected with the seat-standard, the foot-lever pivoted to said arm, and the stop mounted on the standard, whereby the adjustment of the seat is permitted without affecting the operation of the other parts.

7. In a harvesting and binding machine, the combination of a sheaf-carrying mechanism, a rock-shaft for operating the same extending in a fore-and-aft direction, the driver's seat adjustable forward and backward adjacent to the shaft, the operating-arm arranged to slide on said shaft, whereby the relation of the arm to the seat may be maintained, notwithstanding the adjustment of the latter.

8. In combination with the rising and falling bar having carrier-teeth attached thereto, an adjustable stop to limit the falling motion of the bar and teeth.

9. In combination with the rolling bar I, the bar K, and the carrier teeth jointed thereto, the arm G, with bearings to support the bar I, and with an extended end to serve as a stop to limit the descent of the bar K.

10. In combination with a binder-frame of the type herein described and shown, the supporting-arms for a sheaf-carrier, having their ends extended to bear beneath the lower arm of the frame and bolted to the base portion thereof, substantially as described.

In testimony whereof I hereunto set my hand this 26th day of October, 1886, in the presence of two attesting witnesses.

WILLIAM BUTTERFIELD.

Witnesses:
 DAVID HUBERT,
 J. FRANK DAVIS.